(12) United States Patent
Lackey et al.

(10) Patent No.: US 7,525,482 B1
(45) Date of Patent: Apr. 28, 2009

(54) MITIGATION OF ARRAY FACTOR DISTORTIONS FOR GPS AND BROADBAND RECEPTION

(75) Inventors: Raymond J. Lackey, Bohemia, NY (US); Bryan Tropper, Commack, NY (US); Martin E. Somin, Huntington, NY (US); Sondra E. Somin, legal representative, Huntington, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 44 days.

(21) Appl. No.: 11/804,172

(22) Filed: May 17, 2007

(51) Int. Cl.
*H01Q 3/02* (2006.01)
*G01S 5/14* (2006.01)
(52) U.S. Cl. .................. 342/368; 342/357.15
(58) Field of Classification Search .......... 342/368, 342/371, 372
See application file for complete search history.

(56) References Cited

U.S. PATENT DOCUMENTS 5,309,162 A * 5/1994 Uematsu et al. ............ 342/372

6,922,170 B2 * 7/2005 Alexander, Jr. ............. 342/443

* cited by examiner

*Primary Examiner*—Gregory C Issing
(74) *Attorney, Agent, or Firm*—Kenneth P. Robinson (57) ABSTRACT

An adaptive antenna system may be used with a GPS system to improve operation in the presence of interference signals. A resulting adapted antenna pattern will cause array pattern distortions affecting GPS satellite signals received at some signal arrival angles. By determining values of array factor distortions applicable to a GPS satellite signal received at a specific arrival angle via a specific adapted array pattern, a correction signal may be developed for use to mitigate the effect of the applicable array factor distortion. By use of satellite angle data, navigational data, or both, a predictive angle value of a future arrival angle of a satellite signal may be identified. By developing a correction signal applicable to that future arrival angle, corrections for arriving signals can be applied without reliance on stale values. Corrections may be made to the received satellite signal or may be supplied to the GPS system for corrective use during processing of the received signal. Other systems and methods applicable to reception of GPS, broadband or other signals via array antennas with or without adaptive processing are also described.

19 Claims, 2 Drawing Sheets

MITIGATION OF ARRAY FACTOR DISTORTIONS FOR GPS AND BROADBAND RECEPTION

RELATED APPLICATIONS (Not Applicable)

FEDERALLY SPONSORED RESEARCH (Not Applicable)

BACKGROUND OF THE INVENTION

This invention relates to reception of GPS and other signals via an array antenna subject to array factor distortions and which may be arranged to provide anti-jam processing to reduce jamming and interference.

Global Positioning System (GPS) signal receiving systems must accurately process received signals in order to acquire and maintain lock on satellite signals to provide maximum performance in position determination. It has been recognized that for an airborne GPS system the quality of the received signal may be affected by platform dynamics relative to the signal source (e.g., the satellite transmitting the GPS signal being received). Suggestions for augmenting a GPS receiving system for this purpose have included the use of position aiding or correction information derived from an inertial guidance system, as well as velocity aiding or correction information from the same source.

Suggestions have also been made for use of anti-jam antennas for reception of GPS signals to mitigate effects of intentional or unintentional interference signals, including jamming or other signals which may affect reception of GPS signals. In this context, a multi-element controlled reception pattern antenna (CRPA) system may be used with a GPS system for reception of GPS signals. This type of array antenna system may employ adaptive processing to automatically steer a receiving pattern null to the incident angles of one or more incoming interference signals in order to reduce or eliminate reception of such signals and thereby improve reliability of signal reception during operation of a GPS system. Such an antenna pattern which has been modified (e.g., via adaptive processing to form one or more nulls positioned at particular interference signal incidence angles) may be termed an "adapted antenna pattern".

It has been determined that an adapted antenna pattern (e.g., as provided via use of a CRPA system and having a non-uniform reception pattern) has reception characteristics which inherently vary with changes in the arrival or incidence angle of incoming signals. Such reception characteristics may be termed "array factors". As a result, any change in the attitude (roll, pitch, yaw) or position of the antenna (which may also have a velocity or acceleration) may cause an incoming signal to have a different or varying incidence angle relative to the antenna pattern and thereby be subjected to a differing reception characteristic. This differing reception pattern may subject an incoming signal to variations in amplitude, phase and group delay and other effects during signal reception. Such effects may be termed "array factor distortions".

Also, an array antenna located at a fixed or land mobile position may provide an antenna pattern which, while not an adapted pattern, is subject to non-uniformities or variations in reception characteristics with changes in the incident angle of a received signal. While such variations (e.g., array factor distortions) may be of only negligible significance in many applications, in high performance GPS, broadband or other applications such distortions may affect or limit system performance. As an example, a differential GPS (DGPS) installation at an accurately determined fixed position in the vicinity of an airport may receive GPS signals and provide error correction signals to aircraft for improved accuracy of aircraft position determination. However, such accuracy may be limited by array factor distortions introduced by an array antenna employed for reception of GPS satellite signals by the DGPS installation. Array factor distortions may also affect operation in other applications (GPS, broadband, etc.) involving fixed, movable or other array antenna configurations.

The effects or impact of array factor distortions may be relatively unimportant in many applications even where CRPA systems are involved. However, effects of such distortions resulting from signal reception via an antenna system providing an adapted antenna pattern may undesirably affect achievement of high performance objectives. Attention will be directed to the example of an airborne GPS system which may be employed for vehicle guidance. GPS systems whose performance may be undesirably affected by such reception characteristic variations resulting from signal reception via an adapted antenna pattern may include airborne, vehicle mounted, stationary and other GPS systems.

Accordingly, objects of the present invention are to provide new and improved antenna systems and methods, as well as such systems and methods which may be arranged to mitigate effects of array factor distortions associated with signal reception via adapted and other antenna patterns.

SUMMARY OF THE INVENTION

In accordance with one embodiment of the invention, an adaptive antenna system with array factor mitigation, for use with a GPS system and associated satellite angle data and navigational data, includes input ports coupled to an array antenna. An adaptive processor, responsive to antenna signals from the input ports and to a composite GPS signal from a first signal port, is arranged to provide pattern data representative of weighting information used to produce a current adapted antenna pattern responsive to existing interference conditions. A combiner configuration coupled to the input ports is responsive to that weighting information and arranged to combine the antenna signals to form, at the first signal port, a composite GPS signal. A data facility is arranged to provide access to array factor data representative of array factor distortions applicable to signal reception at particular arrival angles via particular adapted antenna patterns implementable by the adaptive antenna system. This adaptive antenna system further includes an array aiding processor responsive to satellite angle data and navigational data and arranged to modify that angle data to provide a predictive angle value of a future arrival angle of a GPS satellite signal. The array aiding processor is coupled to the adaptive processor and the data facility and arranged to utilize the pattern data and the predictive angle value to access the data facility to obtain array factor data applicable to reception at that future arrival angle via the current adapted antenna pattern and to provide at a second signal port an array factor correction signal relating to reception of a GPS signal at that future arrival angle.

Also in accordance with an embodiment of the invention, a method to mitigate effects of array factor distortions on signals received via an array antenna may include the following steps.

(a) making available array factor data representative of array factor distortions applicable to signal reception at particular arrival angles by said array antenna.

(b) identifying an angle value representative of an arrival angle of a signal;

(c) accessing the array factor data with use of that angle value to obtain an estimated value representative of an array factor distortion applicable to signal reception at that arrival angle; and (d) providing, with use of that estimated value, a correction signal usable to mitigate an array factor distortion affecting a signal received at that arrival angle.

This method may additionally include the step of:

(e) employing the correction signal to mitigate effects of an array factor distortion upon a signal received at that arrival angle.

As will be described, that arrival angle may be a predicted future arrival angle of a GPS satellite signal.

For a better understanding of the invention, together with other and further objects, reference is made to the accompanying drawings and the scope of the invention will be pointed out in the accompanying claims.

DESCRIPTION OF THE INVENTION

Figure 1:
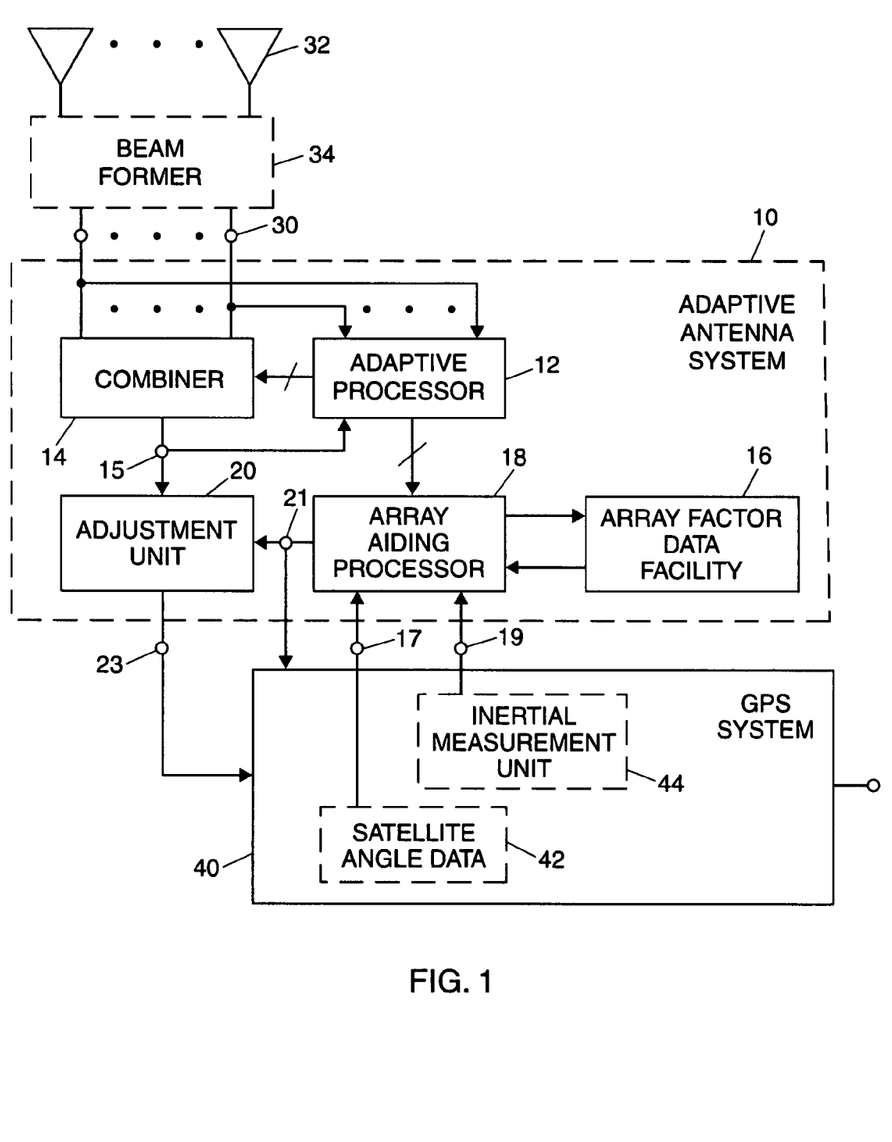
FIG. 1 is a simplified block diagram of one embodiment of an adaptive antenna system arranged to provide array factor mitigation.

FIG. 1 is a simplified block diagram of an embodiment of an adaptive antenna system 10, which may be used with a GPS system 40. As will be described, adaptive antenna system 10 is arranged to operate with array factor mitigation to reduce effects of reception characteristic variations (array factor distortions) associated with reception of GPS signals via an adapted antenna pattern of the type discussed above.

As illustrated, adaptive antenna system 10 includes a plurality of input ports, a representative one of which is shown at 30. The input ports are coupled to an array antenna including a plurality of radiating elements, a representative one of which is shown at 32. In a presently preferred arrangement, the input ports represented by port 30 are each coupled to one of the radiating elements represented by element 32, directly or via any suitable coupling arrangement which may be provided by skilled persons. In some applications it may be appropriate to couple incoming signals via a beam former unit (e.g., unit 34 as represented in FIG. 1) which may be of any suitable form, the use and construction of beam former networks being well known. In such case, the number of input ports may correspond to the number of beam former signal outputs.

The FIG. 1 system 10 includes an adaptive processor 12 responsive to antenna signals coupled via the input ports (e.g., port 30) and to a composite GPS signal coupled via a first signal port 15 to be described. Responsive to those signals, adaptive processor 12 is arranged to provide weighting information usable to provide a current adapted antenna pattern which is responsive to existing interference conditions (i.e., as may be caused by incidence of jamming, interference or other signals, intentional or otherwise). The implementation and use of adaptive processing systems are well known (for basic form and operation of an adaptive processing system employing development and use of weighting signals in a different context see, for example, U.S. Pat. No. 5,952,965). Adaptive processor 12 may, for example, be arranged to derive a plurality of outputs commonly termed complex weighting signals, typically one such signal for each input signal coupled to unit 12 from an input port (e.g., port 30). The complex weighting signals may, for example, be actively adjusted by adaptive processor 12 with the objective of minimizing the signal level at first signal port 15 for one or more interference signals, thereby reducing the presence or effect of interference signals and concurrently increasing the usability of an incoming GPS signal which is accompanied by such interference signals.

As a general matter, it will be appreciated that GPS system 40, may be arranged to process signals arriving at several different arrival angles, each from a different GPS satellite. The present description addresses a configuration for processing signals from one satellite arriving at a single arrival angle (which may change over time). To process incoming signals transmitted by a plurality of satellites, additional processing capability may be provided, for example, by replication of system 10 in whole or in part in parallel or other manner as may be determined by skilled persons to be suitable in particular implementations.

As represented in FIG. 1, weighting information (e.g., complex weighting signals) from adaptive processor 12 are coupled to combiner 14, wherein the signals coupled via the input ports (e.g., port 30) are combined to provide a composite GPS signal at first port 15. However, prior to the signals being combined, the individual signals coupled via the input ports are modified by use of the weighting information to effectively reduce the contribution to the composite GPS signal by an individual signal or signals which include or are affected by the jamming signal. The result of these signal modifications is to provide an adapted antenna pattern effectively having a null or reduced gain characteristic positioned at or near the arrival angle of an interference signal incident at the array antenna. Thus, for example, the weighting information coupled from adaptive processor 12 to combiner 14 may comprise one complex weighting signal for each incoming signal coupled from an input port (e.g., port 30) which is used to modify (e.g., in amplitude and phase) each incoming signal prior to combination of all of the incoming signals to provide the composite GPS signal at first port 15. The composite GPS signal available at first port 15 is a received version of the GPS transmission from a particular satellite and a portion is coupled back from first port 15 to adaptive processor 12 as described above.

As shown, the adaptive antenna system 10 also includes an array factor data facility 16 arranged to provide access to array factor data representative of array factor distortions. As discussed above, reception of GPS signals via an adapted antenna pattern (e.g., a pattern which has been adapted from a basic omnidirectional pattern by provision of one or more nulling effects) will result in distortions to the received GPS signals (e.g., as a result of the reception characteristics of the adapted pattern and other possible effects). For a particular adapted antenna pattern these distortions, which will be termed "array factor distortions", vary depending upon the arrival angle of a signal from a GPS satellite.

Data facility 16 is arranged to provide access to array factor data representative of such array factor distortions applicable to signal reception at particular arrival angles via particular adapted antenna patterns which are implementable by the adaptive antenna system. Thus, at a point in time a specific adapted antenna pattern might incorporate nulling effects implemented at three particular positions within the antenna pattern, for example. Further by way of example, a specific GPS satellite signal may have a particular arrival angle. In this context, if the data facility 16 is supplied with information identifying that specific adapted antenna pattern and identifying the particular arrival angle of the GPS satellite signal, the data facility is arranged to provide access to array factor data representative of the array factor distortions which will affect reception of that specific GPS satellite signal at that point in time. Typically, the point in time may be a point slightly in the future as represented by a predictive angle value of a future arrival angle, in order to accommodate the time required to gain access to a suitable array factor correction and enable a correction signal to be provided so as to be available in time for mitigation of distortions affecting that specific GPS satellite signal. Thus, rather than using array factor data applicable to reception of a signal that has been received, a future arrival angle may be predicted, array factor data for that future arrival angle determined and a correction signal provided and applied to correct for distortions of a future signal as it is received and processed.

Operation of adaptive antenna system 10 as described may thus include determination of a predictive angle value of a future GPS signal arrival angle. With the position and attitude of a receiving antenna constantly subject to change the actual arrival angle of a specific GPS signal will not be determinable until that specific signal arrives. As a result, that specific signal will have been received and passed from combiner 14 to GPS system 40 for processing before a correction signal can be provided. Predictive angle values may be used to address this by enabling a correction signal to be prepared and made available at a time suitable for correction of the specific signal when received. As described, a predictive angle value may be derived by use of satellite angle data and navigational data to estimate a future signal arrival angle. In some applications, alternative approaches may provide acceptable results. For example, it may be appropriate to extrapolate to a predictive angle value by use of the known arrival angles of one or more recently received signals from the same satellite, in order to provide an estimate of a future signal arrival angle. A different approach would be to impose a very short delay (e.g., comparable to the time required for processing by array aiding processor 18) to enable an array factor correction signal applicable to a specific incoming signal to be determined and supplied to adjustment unit 20 coincident with the delayed version of that specific incoming signal becoming ready for corrective action within adjustment unit 20. For example, a fixed delay appropriate for this purpose may be provided by a suitable delay device interposed between signal port 15 and adjustment unit 20 in FIG. 1. In some applications, use of a predictive arrival angle or a delay arrangement may not be necessary. For a fixed position installation, for a system with slowly changing positional variables or in other circumstances, array factor data determined for one arriving signal may be usable for a subsequently arriving signal with acceptable results. In such cases, it may not be necessary to provide for the use of navigational data by array aiding processor 18. However, processing of received GPS satellite signals in the presence of atmospheric changes or dithering or other processing techniques may obviate the acceptability of these alternatives, even for a fixed position system.

Effectively, as described the data facility is accessed or queried as to array factor data which will be applicable for correction of array factor distortions affecting an incoming satellite signal. To enable data facility 16 to provide access to the applicable array factor data on a timely basis, data may be computed in advance for different adapted antenna patterns and for different arrival angles relative to those patterns and made available via the data facility for future access on an as-needed basis. Such array factor data may be stored locally or remotely and may be arranged to support one or more array aiding processors. Alternatively, provision may be made to enable rapid computation of the applicable array factor data upon receipt by data facility 16 of identification of the particular adapted antenna pattern and particular arrival angle. Such computation may be implemented locally, remotely or in other suitable manner. With an understanding of the invention, skilled persons will be enabled to implement the capabilities of data facility 16 in any suitable manner appropriate for a particular application. For example, storage of computed-in-advance data for some but not all relevant arrival angles may be combined with a capability for one or both of interpolation or extrapolation of data, in order to provide data for all relevant arrival angles relative to a particular adapted antenna pattern. It will be appreciated that the preciseness of the array factor data appropriate to be provided may depend upon the rate of change of relevant angle data and the level of accuracy of positional determination required in a particular application, as well as the required update rate of such determination and other factors. Some GPS systems may be mounted on fast moving airborne platforms, while others may be mounted on surface motor vehicles or be mounted at a fixed position.

It will be appreciated that array factor distortions may not affect signals received at many arrival angles via an adapted antenna pattern. If at a point in time there are no relevant interference signals affecting signal reception the antenna pattern will be in an unadapted state and no array factor correction signal may need be provided by array aiding processor. Similarly, if at a point in time the antenna pattern is adapted to provide only a single nulling effect centered at a particular arrival angle, then only signals received at arrival angles in the vicinity of that arrival angle may be subject to significant array factor distortions. In such case, array factor corrections might not be required with respect to all arrival angles outside of that vicinity. Consistent with these examples, array aiding processor 18 may be configured to recognize, for a particular adapted antenna pattern, the signal arrival angles which are not subject to array factor distortions and accordingly neither query data facility 16, nor provide any array factor correction signal at port 21. Other techniques for addressing signal arrivals at angles not subject to array factor distortions for a particular adapted antenna pattern may be employed by skilled persons.

As represented in FIG. 1, array factor data facility 16 is arranged to receive a data access query from array factor processor 18 and provide back to processor 18 applicable array factor data on essentially a real-time basis. The inherent time delay involved in receiving such data at processor 18 and related processing is offset by requesting the data for a predictive angle value representative of a future arrival angle of a signal from a particular GPS satellite, as described.

Array aiding processor 18 is coupled to the data facility 16 to enable access queries for and receipt of array factor data as described. In FIG. 1, array aiding processor 18 is also arranged to receive associated satellite angle data via port 17 and navigational data via port 19 As represented in FIG. 1, satellite angle data is supplied by a satellite angle data source 42 and navigational data is supplied by an inertial measurement unit (IMU) 44, which may each be associated with or included within GPS system 40, or otherwise provided in accordance with established techniques. More particularly, the satellite angle data for this purpose is representative of or adequate for use in determining the current arrival angles for signals received from a specific GPS satellite. Satellite angle data available from a ground perspective may be suitably transformed to a coordinate system of the array antenna for this purpose. The navigational data is representative of or adequate for use in determining estimates of the location and attitude of the array antenna (e.g., element 32) and rates of change thereof (e.g., reflecting some or all of velocity, acceleration, roll, pitch, yaw, etc., as may be relevant under the particular operating conditions then pertaining). The data received via ports 17 and 19 is usable in determining a predictive angle value of a future arrival angle of the signal from the GPS satellite of interest, as discussed.

As shown, array aiding processor 18 is also coupled to adaptive processor 12 and arranged to receive pattern data representative of the weighting information described above as being supplied to combiner 14. As described, the weighting information comprising complex weights applied to incoming signals from the radiating elements is used to form the current adapted antenna pattern and the pattern data is thereby representative of that pattern.

Basically, array aiding processor 18 provides access queries to data facility 16 which identify or are usable to identify (i) the adapted antenna pattern as it currently exists and (ii) the arrival angle relative to that pattern for which array factor data is desired. In the illustrated embodiment, array aiding processor 18 is responsive to satellite angle data (e.g., as received via port 17) and navigational data (e.g., as received via port 19) and arranged to modify that angle data to provide a predictive angle value of a future arrival angle of a GPS satellite signal. Array aiding processor 18 uses the pattern data as received from adaptive processor 12 to provide adaptive pattern information identifying or adequate for identification of the current adapted antenna pattern or its characteristics. Array aiding processor 18 is arranged to utilize the predictive angle data and adaptive pattern information to access data facility 16 to obtain array factor data representative of array factor distortions applicable to signal reception at a particular arrival angle (e.g., a predicted future arrival angle) via a particular adapted antenna pattern (e.g., the current adaptive antenna pattern). Processor 18 then uses the array factor data as thus obtained to provide at second signal port 21 an array factor correction signal relating to reception of a GPS signal satellite at the future arrival angle.

As illustrated, the adapted antenna system may additionally include adjustment unit 20 coupled to first signal port 15 and second signal port 21. Adjustment unit 20 is responsive to the array factor correction signal coupled from array aiding processor 18 and arranged to implement corrections to the composite GPS signal coupled from combiner 14. With such corrections, adjustment unit 20 provides a corrected GPS signal to output port 23 for use by GPS system 40. With this configuration, GPS receiver 40 may routinely process the corrected GPS signal in the same manner as a GPS signal received from an antenna without correction would be processed.

As described, array aiding processor 18 is arranged to access data facility 16 on the basis of a predictive angle value of a future satellite signal arrival angle which has been determined on the basis of satellite angle data and navigational data. The objective is thus to use array factor data applicable to a satellite signal when it is received and to avoid inaccuracies which might result from use of old angle data for reception of new signals at a changed arrival angle. It will be appreciated, however, that a GPS system and associated antenna may not be rapidly changing position, but may be slow moving, stationary or otherwise, or may have lower performance requirements. In such instances it may not be necessary to employ navigational data in order to determine a predictive angle value of a future signal arrival angle as described above. In these and other cases adequate performance may, consistent with the description above, be obtainable by use of: (i) a recent past arrival angle as the basis for accessing data facility 16 to obtain array factor data, (ii) extrapolation based on two or more recent past arrival angles to predict a future arrival angle, or (iii) other estimating techniques which may be implemented by skilled persons.

As shown in FIG. 1, there is a dashed coupling from second signal port 21 directly to GPS system 40. In particular implementations it may be appropriate, rather than providing a corrected GPS signal (e.g., in analog format) at output port 23, to provide an array factor correction signal to GPS system 40 in a form (e.g., in digital format) usable during signal processing implemented within the GPS system. Suggestions have previously been made regarding the introduction of navigational data from an inertial measurement unit (IMU) directly into the signal processing (e.g., Kalman filter processing) implemented within a GPS system in order to improve performance (see, for example, "Antijamming and GPS for Critical Military Applications", at pp. 36-41; *Crosslink Summer* 2002, as published by Aerospace Corp.). Using similar or other suitable techniques skilled persons having an understanding of the invention will be enabled to employ an input in the form of an array factor correction signal from array aiding processor 18 to implement correction of array factor distortions as part of the processing of GPS signals as received.

Figure 2:
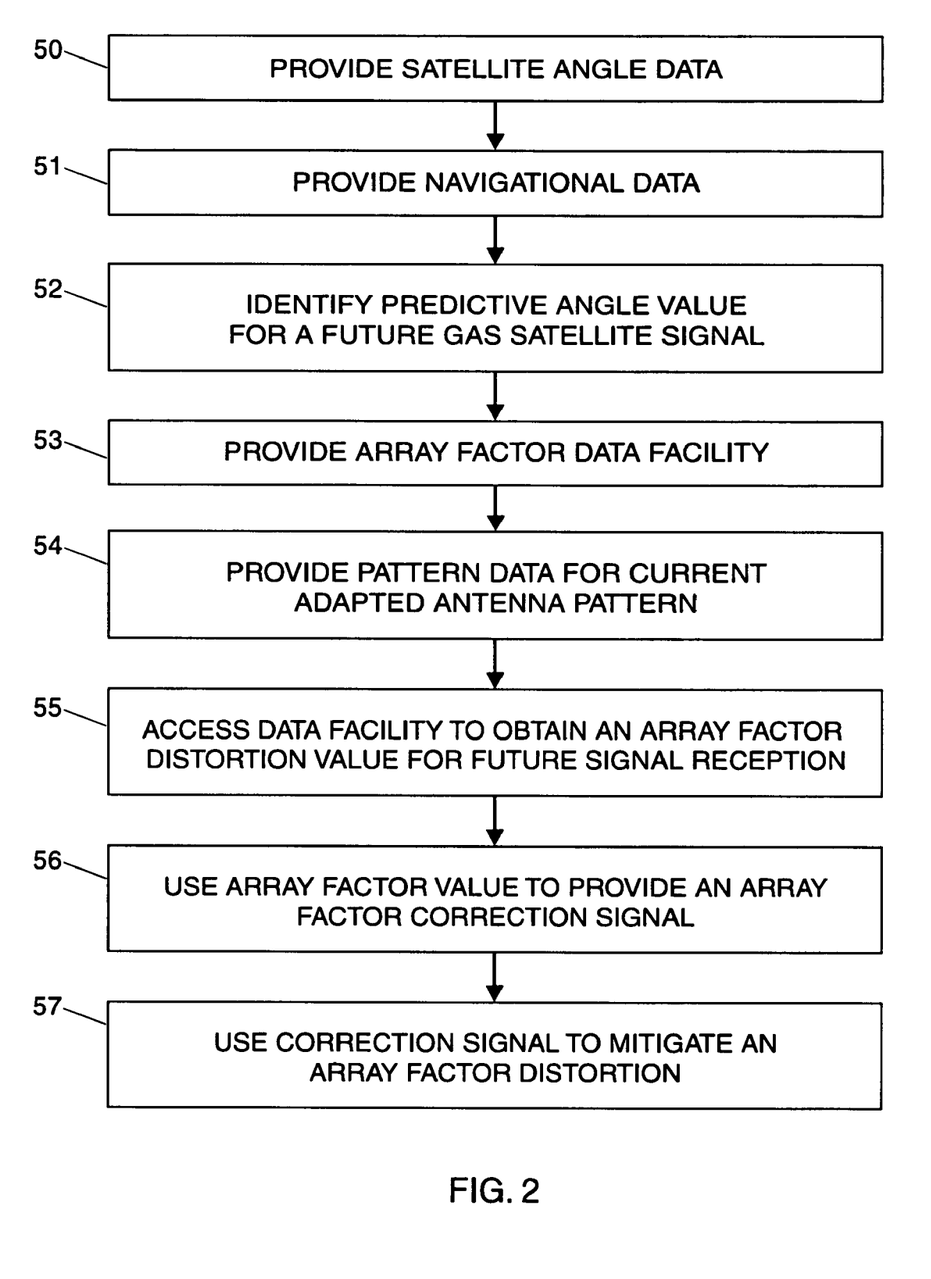
FIG. 2 is a form of flow chart useful in describing one embodiment of a method to mitigate array factor distortions.

Consistent with the foregoing, FIG. 2 is a form of flow diagram useful in describing one embodiment of a method pursuant to the invention. As represented, a method to mitigate array factors, for use with a GPS system arranged to receive GPS signals via an array antenna coupled to an adaptive antenna system, may comprise the steps of:

(a) At 50, providing satellite angle data representative of GPS satellite signal arrival angles relative to the array antenna.

(b) At 51, providing navigational data representative of motion of the array antenna.

(c) At 52, modifying the satellite angle data by use of the navigational data to identify a predictive angle value of a future arrival angle of a GPS satellite signal.

(d) At 53, making available array factor data representative of array factor distortions applicable to signal reception at particular arrival angles via particular adapted patterns implementable by the adaptive antenna system.

(e) At 54, providing pattern data representative of a current adapted antenna pattern implemented by the adaptive antenna system, the pattern data representative of weighting information used to produce that current adapted pattern.

(f) At 55, accessing step (d) data with use of the predictive angle value and pattern data to obtain an estimated value representative of an array factor distortion applicable to signal reception at the future arrival angle.

(g) At 56, providing, with use of the estimated value, an array factor correction signal relating to signal reception at the future arrival angle.

(h) At 57, utilizing the array factor correction signal to mitigate an array factor distortion affecting operation of the GPS system.

With an understanding of this method, skilled persons will be enabled to modify and change the method as appropriate in particular implementations. Thus, for example, steps may be added or omitted and steps may be employed in any appropriate order or combination.

The preceding discussion has particularly addressed the reception of GPS signals via an adapted antenna pattern. However, as initially discussed, signal reception via array antennas may be subject to array factor distortions in the absence of any capability for providing adapted patterns by application of adaptive processing. Such array factor distortions, representing inherent characteristics of an antenna pattern produced by an array of radiating elements, may undesirably affect performance of high performance GPS, broadband communication or other systems. An example is DGPS installations as discussed above, which are intended to provide high accuracy GPS location error data to aircraft. Accordingly, systems and methods to mitigate effects of array factor distortions may be employed in a variety of applications which do not involve adaptive antenna systems or GPS signal reception or both. A method appropriate for use in such applications may, for example, include the following steps:

(a) making available array factor data representative of array factor distortions applicable to signal reception at particular arrival angles by an array antenna;

(b) identifying an angle value representative of an arrival angle of a signal;

(c) accessing the array factor data with use of that angle value to obtain an estimated value representative of an array factor distortion applicable to signal reception at that arrival angle;

(d) providing, with use of the estimated value, a correction signal usable to mitigate array factor distortion affecting a signal received at that arrival angle; and (e) employing the correction signal to mitigate effects of an array factor distortion upon a signal received at that arrival angle.

It will be appreciated that skilled persons will be enabled to modify and adapt this method, for example by inclusion of one or more steps consistent with the first described method, as may be appropriate in particular implementations.

Determination of Array Factor Distortion Data

As described, when a GPS signal is received via an adapted antenna pattern the signal is affected by array factor distortions whose values depend upon the adapted pattern then in effect and the arrival angle of the signal relative to the antenna and thereby to the adapted pattern. As also described, array factor distortions may also affect reception of non-GPS signals via an array antenna pattern which is not adapted.

These distortions, whose magnitude or effect depends upon both the antenna pattern and the arrival angle of an incoming signal, include variations in amplitude, phase, group delay and possible other characteristics of the received signal. Thus, any change in the location or attitude (roll, pitch, yaw) of the antenna array relative to the location of a GPS satellite may, for example, result in a phase shift in the signal carrier and changes in group delay characteristics of the signal. Array factor data representative of these and possible other array factor distortions may be modeled (e.g., estimated by computer) on the basis of modeling of the adaptive antenna patterns which are implementable for a given antenna, for example, and determining estimates of the array factors applicable at various potential arrival angles of signals from GPS satellites or other sources.

In view of the preceding discussion it will be apparent to skilled persons that the invention can be implemented in different ways. On a simplified basis, since the value of distortions relate to receiving a signal via a particular pattern and arrival angle, distortion values may be determined on an antenna test range. An array antenna can be provided, an adapted pattern can be activated and a signal at an arrival angle can be received and the actual distortion can be determined by comparison of the received and transmitted signals. On a repetitive basis, many arrival angles can be used with many adapted pattern variations in order to collect enough data to permit storage thereof and arrangements may be provided to interpolate, for example, between test arrival angles to enable retrieval of array factor distortion data for any relevant arrival angle for each adapted pattern. As discussed above, for any particular adapted pattern there may be many or even a large majority of arrival angles which are not subject to array factor distortions. Alternatively, the relevant distortion values may be computed based upon phase, amplitude and other characteristics of an adapted pattern of an array antenna as applicable to various signal arrival angles relative to that adapted pattern. For this purpose, such computation may employ modeling based upon pattern characteristics of a single radiating element, or small group thereof, as representative of the radiating elements combined to provide a relevant form of complete array antenna. This can be implemented by skilled persons consistent with known forms of modeling and analysis based on consideration of single elements or small groups thereof.

In any of these cases the resulting distortion values (which may be provided as array factors characterized, for example, in terms of the distortions involved or of the corrections suitable to mitigate those distortions) can be stored in array factor data facility 16 or at a remote facility (e.g., accessible via facility 16) and made available to be retrieved via accessing by array factor processor 18 as described above or in other suitable manner. In other implementations, the computation of relevant distortion or correction values may be implemented in essentially real time in support of the operation of adaptive antenna system 10 via a processing facility within or external to system 10.

For operation of a GPS system, the retrieved array factor data can be utilized as described above to mitigate effects of aperture induced group delay on the code phase of an incoming signal, the impact of aperture induced phase delay on carrier phase tracking, as well as other possible distortions introduced as a result of signal reception via an adapted antenna pattern. It will be appreciated that for GPS system operation, signals will be actively received from a plurality of GPS satellites, each associated with a different respective arrival angle. Accordingly, array factor data must be retrieved with respect to each relevant arrival angle for the current adapted antenna pattern existing for the receiving array antenna. This can be implemented via arrangements with replications of array aiding processor 18 operating in parallel for signals from different GPS satellites with different arrival angles, with access to separate or shared data facilities.

In operation, in a static environment (e.g., fixed position) the code delay and carrier phase delay distortions introduce biases to the received signal delivered to the GPS receiver. In a dynamic environment (e.g., antenna changing position, attitude) these distortions may also introduce bandwidth tracking errors. The particular amounts of code delay and carrier phase delay are functions of the phase progression across the aperture with the adapted pattern, the individual element signal weights provided to form the adapted pattern, the motion experienced by the array antenna and possible other factors.

The adapted antenna pattern is formed by multiplying each individual received signal (e.g., from port 30) by the complex amplitude and phase weight for that signal utilizing known techniques, as discussed above with reference to adaptive processor 12. For present purposes development of array factor data (e.g., representing distortions or corrections for distortions) for use in mitigating array factor distortions can, by way of example, be implemented in the following manner. Array aiding processor 18 is arranged to receive from adaptive processor 12 pattern data representative of the weighting information used to form the current adapted pattern. Such pattern data may take the form of the actual complex weight signals as provided to combiner 14 or other form suitable for use within array aiding processor 18. Individual pattern data signals representing the weighting signals may be summed and subjected to a fast fourier transform (FFT) operation to provide a complex aperture transfer function (as a function of azimuth and elevation, Az/El) representative of the current adapted antenna pattern. A representation of a recovered pseudonoise (PN) code sequence can be converted to the frequency domain via an FFT operation. By then multiplying the conjugate of the complex aperture transfer function with the spectrum of the recovered PN code, there can be obtained the spectrum of the altered PN code sequence (i.e., as altered by reception via the adapted antenna pattern).

The spectrum of the altered PN code sequence is then multiplied by the voltage spectrum of an internally generated PN code sequence, with the result subjected to an inverse fast fourier transform (IFFT) operation to form an altered cross-correlation function. The spectrum of an ideal PN code sequence is multiplied by the voltage spectrum of the internally generated PN code sequence, with the result subjected to an IFFT operation to form an ideal cross-correlation function.

The altered and ideal cross-correlation functions are then employed to respectively provide a first epoch derived via cross-correlation with the aperture altered PN code sequence and a second epoch derived via cross-correlation with an ideal PN code sequence. Comparison of these first and second epochs is then utilized to derive the code delay bias due to the complex transfer function. This code delay bias value for a specific arrival angle signal received via a specific adapted antenna pattern will be manifested in a biased pseudorange measurement which, in the absence of mitigation, would be introduced into the processing of received GPS signals by a GPS receiver system. This code delay bias value, or a correction value appropriate to mitigate the effect of this code delay bias value, can be stored in data facility 16 for retrieval by array aiding processor 18 as discussed, or otherwise made available for access (e.g., as stored values or values determined on demand) via the data facility 16.

As an additional array factor distortion, phase variation characteristics of the adapted antenna pattern may impart a phase delay bias to the signal carrier, which will be manifested as a biased pseudorange code measurement, if the GPS receiver system employs carrier phase processing. By processing consistent with that discussed above, but directed to determination of the adapted pattern aperture induced phase delay, a value of the phase delay bias for a specific arrival angle signal received via a specific adapted antenna pattern can be determined and made available for retrieval via data facility 16 as described.

The preceding addresses an example of one approach for deriving code delay bias and carrier phase shift bias values for a static case. Platform dynamics representing changes in position and attitude of the antenna in combination with array factor distortions introduced by an adapted pattern may additionally create bandwidth induced tracking errors. Such errors may be taken into consideration with respect to operation and capabilities of code and carrier tracking loops and the bandwidth of loop filters included in such loops in established types of GPS receiver system designs. If loop bandwidths are too small in frequency relative to effects of adapted pattern array factors together with platform motion effects, the loops will not respond quickly enough to track out the applicable group delay and may experience dynamic stress errors. These issues may be addressed by persons skilled in GPS receiver system design and evaluation techniques. Basically, if a spatial distribution of code delay produced by signal reception via an adapted antenna pattern is multiplied by angular rate of change as sensed by a platform IMU, the result will be values for the angular rate of change of code delay. These values can be compared to the bandwidth of loop filters in the GPS receiver tracking loops to provide an indication of bandwidth induced tracking error to be considered in evaluating receiver performance. Correspondingly, spatial distribution of carrier phase bias values introduced by the adapted antenna pattern can be multiplied by angular rate of change as sensed by the platform IMU to yield angular rate of change values of phase delay. These values can be compared to the bandwidth of the loop filters to provide an indication of bandwidth induced tracking errors to be considered in evaluating receiver performance.

Thus, signal reception via an adapted antenna pattern will introduce array factor distortions which may include bias errors representing instantaneous fixed errors affecting each satellite/receiver pair as well as bandwidth induced errors representing dynamic errors as described. With determination of array factor data regarding array factor distortions, such data can be utilized in the context of adaptive antenna systems and methods to mitigate array factor distortions as described above.

While there have been described the currently preferred embodiments of the invention, those skilled in the art will recognize that other and further modifications may be made without departing from the invention and it is intended to claim all modifications and variations as fall within the scope of the invention.

What is claimed is:

1. An adaptive antenna system with array factor mitigation, for use with a GPS system and associated satellite angle data, said adaptive antenna system comprising:
   input ports coupled to an array antenna;
   an adaptive processor, responsive to antenna signals from said input ports and to a composite GPS signal from a first signal port, and arranged to provide pattern data representative of weighting information used to produce a current adapted antenna pattern responsive to existing interference conditions;
   a combiner configuration coupled to said input ports, responsive to said weighting information and arranged to combine said antenna signals to form, at said first signal port, a composite GPS signal;
   a data facility arranged to provide access to array factor data representative of array factor distortions applicable to signal reception at particular arrival angles via particular adapted antenna patterns implementable by said adaptive antenna system; and
   an array aiding processor responsive to said satellite angle data and arranged to provide an angle value of an arrival angle of a GPS satellite signal;
   said array aiding processor coupled to said adaptive processor and said data facility and arranged to utilize said pattern data and said angle value to access the data facility to obtain array factor data applicable to reception at said arrival angle via said current adapted antenna pattern and to provide at a second signal port an array factor correction signal relating to reception of a GPS signal at said arrival angle.

2. An adaptive antenna system as in claim 1, wherein said array aiding processor is:
   additionally responsive to navigational data associated with the GPS system and arranged to modify said satellite angle data to provide a predictive angle value of a future arrival angle of a GPS satellite signal; and arranged to utilize said pattern data and said predictive angle value to access the data facility to obtain array factor data applicable to reception at said future arrival angle via said current adapted antenna pattern and to provide at said second signal port an array factor correction signal relating to reception of a GPS signal at said future arrival angle.

3. An adaptive antenna system as in claim 1, wherein said array aiding processor is:
arranged to extrapolate said satellite angle data to provide a predictive angle value of a future arrival angle of a GPS satellite signal; and
arranged to utilize said pattern data and said predictive angle value to access the data facility to obtain array factor data applicable to reception at said future arrival angle via said current adapted antenna pattern and to provide at said second signal port an array factor correction signal relating to reception of a GPS signal at said future arrival angle.

4. An adaptive antenna system as in claim 1, additionally comprising:
an adjustment unit coupled to said first and second signal ports and responsive to said array factor correction signal to implement a correction to said composite GPS signal and provide a corrected GPS signal for use by a GPS system.

5. An adaptive antenna system as in claim 1, additionally comprising:
a coupling from said second signal port to said GPS system to provide said array factor correction signal in digital format for use during processing of a GPS satellite signal received at said arrival angle to implement a correction mitigating an array factor distortion affecting that signal.

6. An adaptive antenna system as in claim 1, wherein said input ports consist of a number of input ports and said adaptive processor provides to said combiner configuration said weighting information in the form of the same said number of complex weighting signals and provides to said array aiding processor said pattern data in the form of the same said number of pattern data signals.

7. An adaptive antenna system as in claim 1, additionally comprising:
a beam former unit coupled between said array antenna and said input ports.

8. An adaptive antenna system as in claim 1, wherein said array aiding processor is arranged to utilize said pattern data to identify the current adapted antenna pattern and utilize that identification of the current adapted antenna pattern for purposes of accessing the data facility to obtain said array factor data.

9. An adaptive antenna system as in claim 1, wherein said array aiding processor is arranged (i) to utilize said pattern data and angle value to make an initial estimate of the level of array factor distortions applicable to signal reception at said angle value via said current adapted antenna pattern, (ii) to access the data facility only if said level as estimated exceeds a predetermined level and (iii) to provide no correction indication at said second signal port if said level as estimated does not exceed said predetermined level.

10. An adaptive antenna system as in claim 1, wherein said data facility is arranged to provide access to array factor data based on interpolation between said particular arrival angles to provide estimated array factor data, when array factor data is not accessible for said arrival angle.

11. For use with a GPS system arranged to receive GPS signals via an array antenna coupled to an adaptive antenna system, a method to mitigate array factor distortions comprising the steps of:
(a) providing satellite angle data representative of GPS satellite signal arrival angles relative to said array antenna;
(b) providing navigational data representative of motion of said array antenna;
(c) modifying said satellite angle data by use of said navigational data to identify a predictive angle value of a future arrival angle of a GPS satellite signal;
(d) making available array factor data representative of array factor distortions applicable to signal reception at particular arrival angles via particular adapted patterns implementable by said adaptive antenna system;
(e) providing pattern data representative of a current adapted antenna pattern implemented by said adaptive antenna system, said pattern data representative of weighting information used to produce that current adapted pattern;
(f) accessing said step (d) array factor data with use of said predictive angle value and said pattern data to obtain an estimated value representative of an array factor distortion applicable to signal reception at said future arrival angle; and
(g) providing, with use of said estimated value, an array factor correction signal relating to signal reception at said future arrival angle.

12. A method as in claim 11, additionally comprising the step of:
(h) utilizing said array factor correction signal to mitigate an array factor distortion affecting operation of said GPS system.

13. A method as in claim 11, additionally comprising the step of:
(h) utilizing said array correction signal in analog format to provide a correction to a signal received at said future arrival angle from a GPS satellite to mitigate an array factor distortion affecting that signal.

14. A method as in claim 11, additionally comprising the step of:
(h) coupling said array correction signal in digital format to said GPS system for use to mitigate an array factor distortion during processing of a signal received at said future arrival angle from a GPS satellite.

15. A method to mitigate effects of array factor distortions on signals received via an array antenna, comprising the steps of:
(a) making available array factor data representative of array factor distortions applicable to signal reception at particular arrival angles by said array antenna;
(b) identifying, with use of satellite angle data, a predictive angle value representative of a future arrival angle of a GPS satellite signal;
(c) accessing said array factor data with use of said angle value to obtain an estimated value representative of an array factor distortion applicable to GPS satellite signal reception at said future arrival angle; and
(d) providing, with use of said estimated value, a correction signal usable to mitigate array factor distortion affecting a GPS satellite signal received at said future arrival angle.

16. A method as in claim 15, additionally comprising the step of:

(e) employing said correction signal to mitigate effects of an array factor distortion upon a GPS satellite signal received at said future arrival angle.

17. A method as in claim 15, wherein steps (b) and (c) comprise:
   (b) identifying an angle value representative of an arrival angle of a GPS satellite signal and extrapolating said angle value to identify a predictive angle value of a future arrival angle representative of a future arrival angle of a GPS satellite signal; and
   (c) accessing said array factor data to obtain an estimated value representative of an array factor distortion applicable to GPS satellite signal reception at said future arrival angle.

18. A method as in claim 15, wherein in step (c) access to array factor data comprises access to specific array factor data representative of an array factor distortion applicable to signal reception at said future arrival angle by said antenna, for providing an estimated value representative of an array factor distortion applicable to GPS satellite signal reception at said future arrival angle.

19. A method as in claim 15, wherein step (a) includes making available estimated array factor data based on interpolation between data for said particular arrival angles, when array factor data is not accessible for said future arrival angle.

* * * * *